Figure 1:
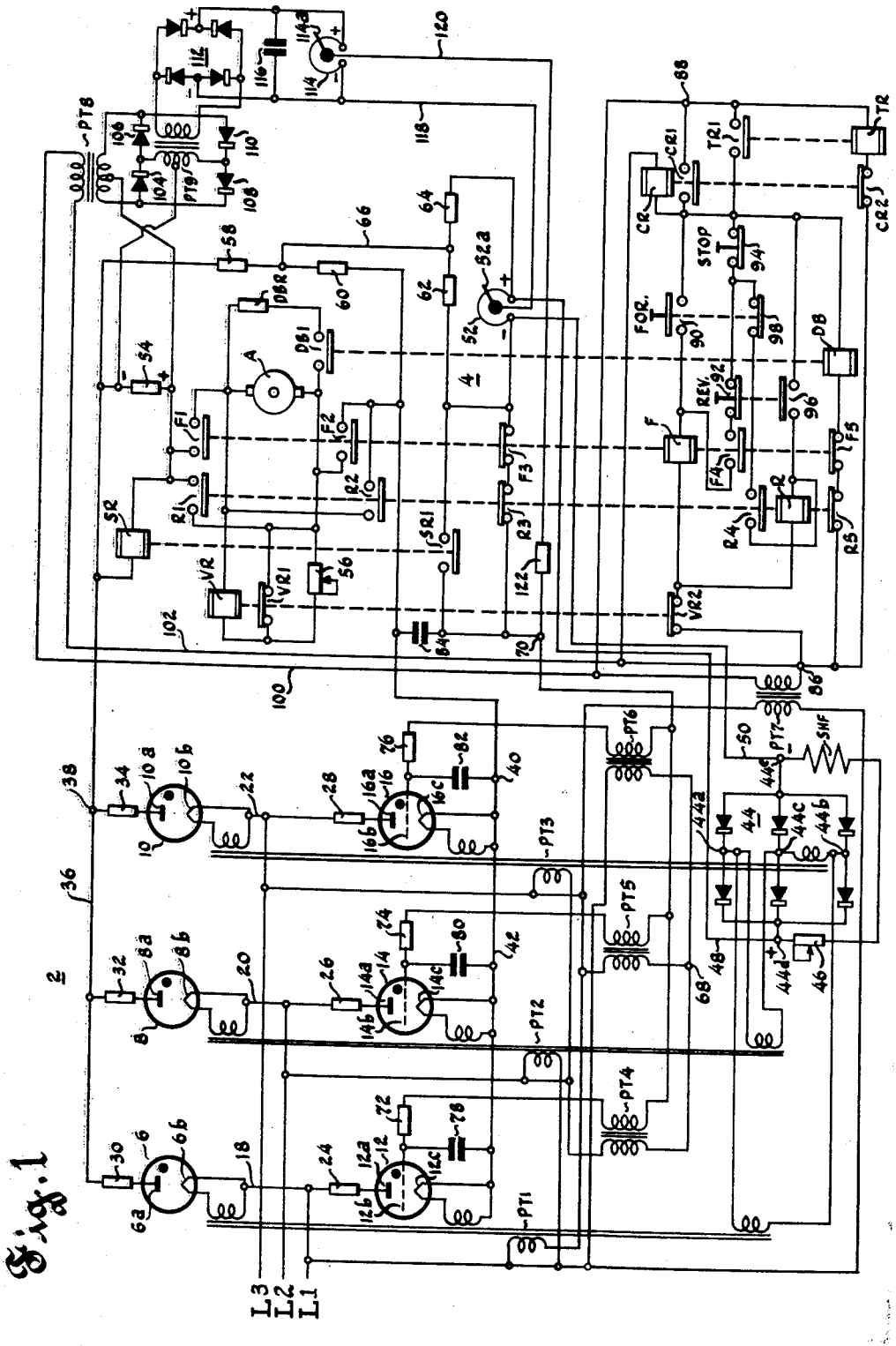

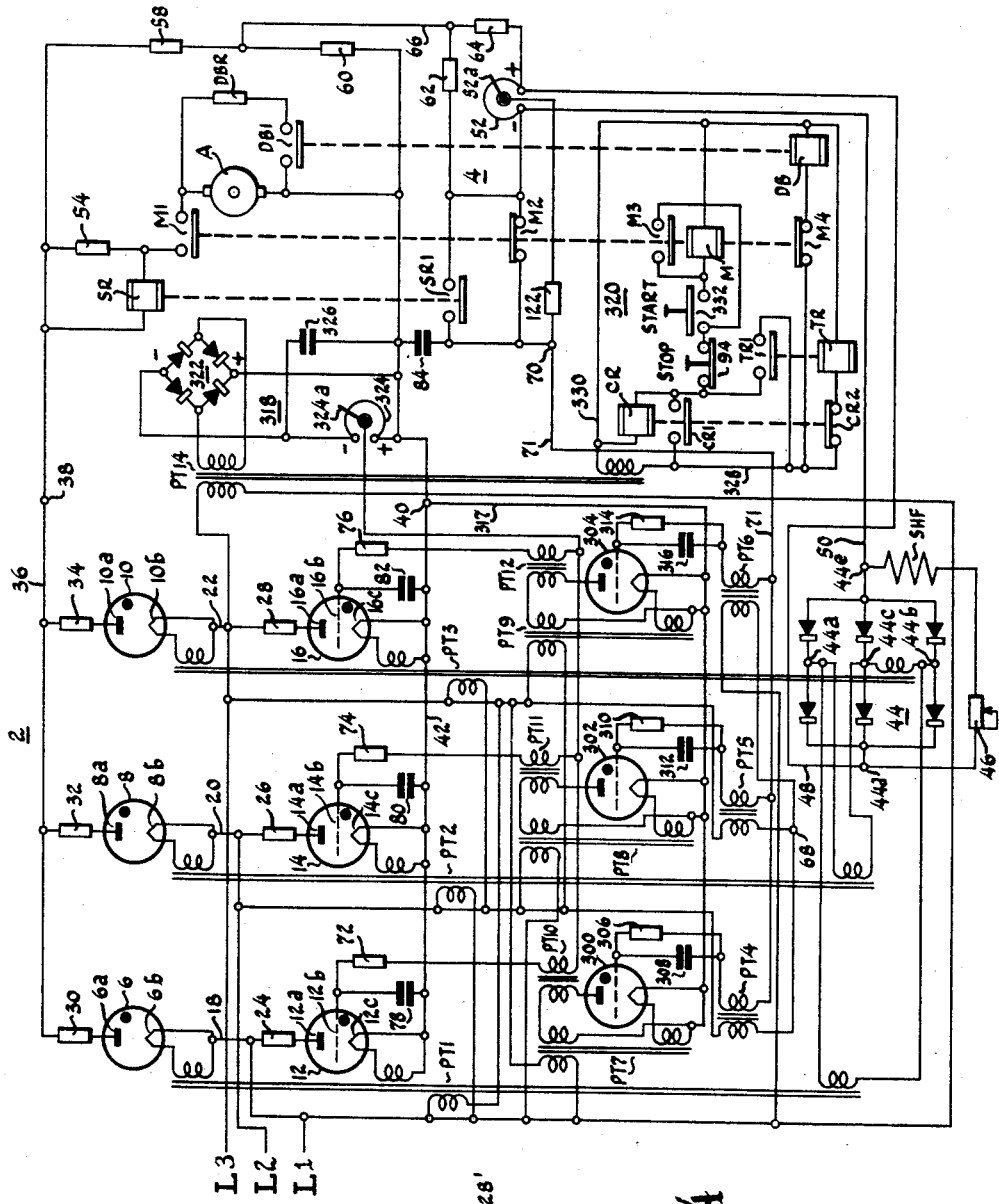

United States Patent Office 2,929,979
Patented Mar. 22, 1960

2,929,979

MOTOR CONTROL SYSTEM

Paul M. Fischer, Milwaukee, Wis., assignor to Cutler-Hammer, Inc., Milwaukee, Wis., a corporation of Delaware Application September 23, 1957, Serial No. 685,599

12 Claims. (Cl. 318—331)

This invention relates to control systems for transferring energy between alternating current and direct current networks.

While not limited thereto, the invention is especially applicable to systems for supplying and controlling power from a plural-phase alternating current power supply source to the field and armature windings of direct current motors.

An object of the invention is to provide improved means having plural control functions for supplying and selectively controlling power from a plural-phase alternating current power supply source to a plurality of direct current networks.

Another object of the invention is to provide an improved power supply system affording selectively adjustable excitation of the armature windings of a direct current motor from an alternating current power supply source.

A further object of the invention is to provide an improved motor power supply control system affording both selective manual adjustment and automatic control of the speed of a direct current motor.

A still further object of the invention is to provide an improved control system for supplying controllable full-wave rectified alternating current energy to the direct current armature and shunt field windings of a direct current motor.

A further specific object of the invention is to provide an improved electronic motor control system having a plural-phase, electron discharge tube rectifier network including means affording uniform, accurately-balanced tube operation not adversely affected by stored energy in the motor inductance.

Another specific object of the invention is to provide such electronic motor control system with improved means affording long tube life in a high voltage motor power supply system.

While the apparatus hereinafter described is effectively adapted to fulfill the objects stated, it is to be understood that I do not intend to confine my invention to the particular preferred embodiments of motor control system disclosed, inasmuch as they are susceptible of various modifications without departing from the scope of the appended claims.

In the drawings, Figure 1 illustrates a motor reversing control system constructed in accordance with the present invention;

Fig. 2 graphically illustrates the operating characteristics of the controlled rectifier tubes of Fig. 1;

Fig. 3 illustrates a modified motor control system in accordance with the invention; and Fig. 4 graphically depicts the operating characteristics of the controlled rectifier tubes of Fig. 3.

Referring to Fig. 1 there is shown a reversing control system for a direct current motor having an armature A and a shunt field winding SHF. A bridge or full-wave electron discharge tube rectifier system indicated generally as 2 is provided for supplying full-wave rectified alternating current power from a three-phase power supply source to armature A of the motor. A speed control network indicated generally as 4 is provided for manually controlling the armature voltage to adjust the speed of the motor. Rectifier network 2 comprises three rectifiers shown as uncontrolled rectifier tubes 6, 8 and 10 and three controlled rectifier tubes 12, 14 and 16 of the gas or vapor filled type or the like. Rectifier tube 6 comprises an anode 6a and a cathode 6b, rectifier tube 8 comprises an anode 8a and a cathode 8b, while rectifier tube 10 comprises an anode 10a and a cathode 10b. Controlled rectifier tube 12 comprises an anode 12a, a control electrode 12b and a cathode 12c; controlled rectifier 14 comprises an anode 14a, a control electrode 14b and a cathode 14c; and controlled rectifier 16 comprises an anode 16a, a control electrode 16b and a cathode 16c.

Power supply lines L1, L2 and L3 are connected through suitable "on-off" switches to a three-phase power supply source (not shown). The cathodes 6b, 8b and 10b of uncontrolled rectifier tubes 6, 8 and 10 are respectively connected to anodes 12a, 14a and 16a of controlled rectifier tubes 12, 14 and 16 through conductors 18, 20 and 22 and resistors 24, 26 and 28, respectively. Power supply lines L1, L2 and L3 are connected to conductors 18, 20 and 22, respectively. Anodes 6a, 8a and 10a of uncontrolled rectifier tubes 6, 8 and 10 are connected through resistors 30, 32 and 34, respectively, and conductor 36 to an output terminal 38. Cathodes 12c, 14c and 16c of controlled rectifier tubes 12, 14 and 16 are connected together and to output terminal 40 through conductor 42.

Transformers PT1, PT2 and PT3, each having a primary winding and three secondary windings, are provided for supplying power from the respective phases of the power supply source for heating the cathodes of the uncontrolled and controlled rectifier tubes and for energizing a full-wave field supply rectifier bridge 44. The primary winding of transformer PT1 is connected across conductors L1 and L3. The primary winding of transformer PT2 is connected across conductors L2 and L1. The primary winding of transformer PT3 is connected across conductors L3 and L2. The upper secondary winding of transformer PT1 is connected across cathode 6b of uncontrolled rectifier tube 6, the middle secondary winding is connected across cathode 12c of controlled rectifier tube 12 and the lower secondary winding is connected across input terminals 44a and 44b of rectifier bridge 44. Similarly the upper and middle secondary windings of transformer PT2 are connected across the cathodes of rectifier tubes 8 and 14, respectively, while the lower secondary winding is connected across input terminals 44a and 44c of rectifier bridge 44. Also the upper and middle secondary windings of transformer PT3 are connected across the respective cathodes of rectifier tubes 10 and 16 while the lower secondary winding is connected across input terminals 44b and 44c of rectifier bridge 44.

Output terminals 44d and 44e of rectifier bridge 44 are connected on the one hand through an adjustable resistor 46 to shunt field winding SHF and on the other hand through conductors 48 and 50 to the opposite sides of speed setting rheostat 52.

Armature A of the motor is connected across the output terminals of rectifier tube network 2 in a circuit extending from output terminal 38 through resistor 54, normally open contacts F1 of forward contactor F, armature A and normally open contacts F2 to output terminal 40. An alternative circuit for reversely energizing armature A extends from output terminal 38 through resistor 54, normally open contacts R1 of reverse contactor R, armature A and normally open contacts R2 to output terminal 40. A dynamic braking resistor DBR is series connected with normally open contacts DB1 across armature A. An antiplugging or voltage relay VR has its operating coil series connected with its normally closed contacts VR1 across armature A. An adjustable resistor 56 is connected in shunt of contacts VR1 for reasons hereinafter described. A current limit relay SR has its operating coil connected across resistor 54 in the armature circuit. A voltage divider comprising series connected resistors 58 and 60 is connected across output terminals 38 and 40 for reasons hereinafter described.

Speed control network 4 comprises the aforementioned speed-setting rheostat 52 supplied with rectified three-phase alternating current from bridge 44 through conductors 48 and 50. A voltage divider comprising series connected resistors 62 and 64 is connected across rheostat 52 while the junction of these resistors is connected through conductor 66 to the junction of resistors 58 and 60.

Transformers PT4, PT5 and PT6 having their primary windings in series connection with the power supply lines are provided for supplying phase displaced alternating voltages from the three-phase power supply source to the control electrode circuits of controlled rectifier tubes 12, 14 and 16, respectively. First ends of the primary windings of transformers PT4, PT5 and PT6 are connected together at common point 68 while the other ends of these primary windings are connected to lines L2, L3 and L1, respectively.

The negative end of speed-setting rheostat 52 is connected to the control electrode circuits of controlled rectifier tubes 12, 14 and 16 through a circuit comprising a first parallel section having normally closed contacts F3 and R3 series connected in one branch thereof and normally open contacts SR1 in the other branch thereof, and then through common point 70 where the circuit divides. One branch extends through the secondary winding of transformer PT4 and resistor 72 to control electrode 12b of controlled rectifier tube 12, a second branch extends through the secondary winding of transformer PT5 and resistor 74 to control electrode 14b, and the third branch extends through the secondary winding of transformer PT6 and resistor 76 to control electrode 16b. Control electrodes 12b, 14b and 16b are connected through respective filter capacitors 78, 80 and 82 to conductor 42. Common point 70 is connected through capacitor 84, output terminal 40 and conductor 42 to the cathodes of the controlled rectifier tubes.

A transformer PT7 having its primary winding connected across lines L1 and L3 is provided for supplying the contactor network shown in the lower portion of Fig. 1 as well as the IR drop compensation network shown in the upper right-hand portion of Fig. 1. The secondary winding of transformer PT7 is connected across input terminals 86 and 88 of the contactor network. This network comprises a timing device TR of the motor driven type or the like having its operating coil connected through normally closed contacts CR2 of control relay CR across terminals 86 and 88. The operating coil of control relay CR is connected across terminals 86 and 88 through normally open contacts TR1 of timing device TR. A holding circuit is provided for control relay CR through normally open contacts CR1 in shunt of contacts TR1. The operating coil of forward contactor F is connected across terminals 86 and 88 through normally closed contacts VR2 of the aforementioned relay VR, normally open contacts 90 of a forward switch and contacts CR1. A holding circuit for contactor F in shunt of contacts 90 extends through normally open contacts F4, normally closed contacts 92 of a reverse switch and normally closed contacts 94 of a stop switch. The operating coil of reverse contactor R is connected across terminals 86 and 88 through the aforementioned contacts VR2, normally open contacts 96 of the reverse switch and contacts CR1. A holding circuit for contactor R in shunt of contacts 96 extends through normally open contacts R4, normally closed contacts 98 of the forward switch and stop switch contacts 94. The operating coil of dynamic braking contactor DB is connected across terminals 86 and 88 through normally closed reverse contacts R5, normally closed forward contacts F5 and contacts CR1.

The IR drop compensation network shown in the upper right-hand portion of Fig. 1 is provided with a transformer PT8 having its primary winding connected across the secondary winding of transformer PT7 through conductors 100 and 102. The secondary winding of transformer PT8 is connected across a two branch rectifier network having half-wave rectifier pairs 104, 106 and 108, 110 series connected in the respective parallel branches thereof, one rectifier pair being oppositely poled relative to the other rectifier pair. The primary winding of a transformer PT9 is connected across the junctions of the rectifiers in each pair. Center taps on the secondary and primary windings of respective transformers PT8 and PT9 are connected across resistor 54 in the motor armature circuit. The secondary winding of transformer PT9 is connected across the input terminals of a full-wave rectifier bridge 112, the latter having its positive and negative output terminals connected across a compensation rheostat 114. A filter capacitor 116 is connected in parallel with rheostat 114 to smooth the rectified output voltage from bridge 112. Adjustable arm 52a of speed-setting rheostat 52 is connected through conductor 118 to the negative end of rheostat 114 while adjustable arm 114a of the latter is connected through conductor 120 and resistor 122 to common point 70 in the control electrode circuit of the controlled rectifier tubes.

The rectifier system 2 comprising uncontrolled rectifier tubes 6, 8 and 10 and controlled rectifier tubes 12, 14 and 16 provides controllable full-wave rectified power from the three-phase power supply source to the armature winding of the direct current motor in a manner hereinafter more fully described. Although the rectifier system has been illustrated as having discharge tubes, it will be understood that other types of rectifiers might as well be used in place thereof.

Referring to Fig. 1, let it be assumed that power is supplied to lines L1, L2 and L3 from a three-phase power supply source through the aforementioned "on-off" switches. Thus, power is supplied through the primary windings and the upper and middle secondary windings of transformers PT1, PT2 and PT3 to the cathodes of the uncontrolled and controlled rectifier tubes to heat the same. Power is also supplied through the lower secondary windings of transformers PT1, PT2 and PT3 to input terminals 44a, 44b and 44c of rectifier bridge 44, and then from the positive and negative output terminals 44d and 44e of the latter on the one hand through resistor 46 across shunt field winding SHF and on the other hand through conductors 48 and 50 across speed-setting rheostat 52. In addition, power is supplied from lines L1, L2 and L3 through resistors 24, 26 and 28 to respectively associated anodes 12a, 14a and 16a of the controlled rectifier tubes 12, 14 and 16; and then through cathodes 12c, 14c and 16c of these tubes and common conductor 42 to output terminal 40. Alternating bias voltages are applied from lines L1, L2 and L3 through transformers PT6, PT4 and PT5 and resistors 76, 72 and 74 to control electrodes 16b, 12b and 14b, respectively, of controlled rectifier tubes 16, 12 and 14. As will hereinafter appear, transformers PT4, PT5 and PT6 are connected and arranged to apply alternating voltages to the control electrodes of the controlled rectifier tubes which are displaced in phase relative to the anode voltages thereof. Furthermore, power is supplied from lines L1 and L3 through transformer PT7 on the one hand to input terminals 86 and 88 of the contactor network and on the other hand through conductors 100 and 102 to reference signal transformer PT8 in the IR drop compensation network.

As will be apparent, the alternating reference signal voltage applied to transformer PT8 in the IR drop compensation network renders rectifier pairs 104, 106 and 108, 110 conductive on alternate half-cycles of the alternating voltage. Thus, when the right-hand end of the secondary winding of transformer PT8 is positive, rectifiers 108 and 110 conduct, and when the left-hand end of the secondary winding is positive, rectifiers 104 and 106 conduct.

Application of alternating voltage to input terminals 86 and 88 of the contactor network as aforementioned results in energization of the operating coil of timing device TR through contacts CR2. After a predetermined time interval contacts TR1 close to complete an energizing circuit for the operating coil of control relay CR across input terminals 86 and 88. Relay CR thus being energized closes contacts CR1 to complete a holding circuit for its operating coil in shunt of contacts TR1, and opens contacts CR2 to interrupt the energizing circuit of timing device TR. The aforementioned closure of contacts TR1 followed by the closure of contacts CR1 also completes an energizing circuit for the operating coil of dynamic braking contactor DB through contacts F5 and R5. Contactor DB thus being energized closes contacts DB1 to connect dynamic braking resistor DBR across armature A. The control system is now in a preparatory condition wherein shunt field winding SHF is energized and dynamic braking is applied to prevent armature rotation.

To start the motor in the forward direction, the forward switch is momentarily pressed to close contacts 90 and open contacts 98. Closure of contacts 90 completes an energizing circuit for the operating coil of forward contactor F through contacts VR2 and the then closed contacts CR1 of control relay CR. Opening of interlocking contacts 98 interrupts the holding circuit of reverse contactor R to prevent simultaneous energization of the latter. Contactor F thus being energized closes contacts F1 and F2 to complete an energizing circuit for armature A, assuming that speed-setting rheostat 52 is set so that the control electrodes of controlled rectifier tubes 12, 14 and 16 are biased to render the latter conducting. The armature circuit may be traced from line L3 through conductor 22, resistor 28, anode 16a and cathode 16c of tube 16, conductor 42, output terminal 40, contacts F2, armature A, contacts F1, resistor 54 and the operating coil of relay SR in parallel, output terminal 38, conductor 36, resistor 32, anode 8a and cathode 8b of uncontrolled rectifier tube 8, and conductor 20 to line L2. Similar circuits may be traced from line L2 to line L1 through controlled rectifier tube 14, armature A and uncontrolled rectifier tube 6; and from line L1 to line L3 through controlled rectifier tube 12, armature A and uncontrolled rectifier tube 10. It should therefore be apparent that upon establishment of the motor power connections, full-wave rectified alternating current power is applied to the motor armature through rectifier network 2 comprising the three controlled and three uncontrolled rectifier tubes.

Contactor F also opens contacts F5 to interrupt the energizing circuit of the operating coil of contactor DB, whereupon the aforementioned dynamic braking circuit is interrupted at contacts DB1. Contactor F closes contacts F4 to complete a holding circuit for its operating coil through contacts 92 and 94 in shunt of forward switch contacts 90 so that the forward switch may be released. Furthermore, contactor F opens contacts F3 to disconnect the negative side of rheostat 52 from capacitor 84 to permit the latter to charge in accordance with the positive potential at common point 70 as hereinafter more fully described.

The three-phase alternating voltage applied to input terminals 44a, 44b and 44c of rectifier bridge 44 is rectified therein and applied from the positive and negative output terminals of the latter through conductors 48 and 50 across speed-setting rheostat 52. An adjustable portion of this rectified alternating voltage is applied from adjustable arm 52a through conductor 118, the left-hand portion and arm 114a of rheostat 114, conductor 120 and resistor 122 to common point 70, and then to the control electrodes of controlled rectifier tubes 12, 14 and 16 to control conduction of the latter. The latter circuits from common point 70 may be traced through the secondary winding of transformer PT4 and resistor 72 to control electrode 12b; through the secondary winding of transformer PT5 and resistor 74 to control electrode 14b; and through the secondary winding of transformer PT6 and resistor 76 to control electrode 16b.

The amount of conduction of controlled rectifier tubes 12, 14 and 16 and thus the armature voltage is preselected and controlled by adjustment of arm 52a of speed-setting rheostat 52. As arm 52a is moved from the left-hand negative end of its associated resistor toward the right-hand positive end, the unidirectional control voltage applied to the control electrodes of the controlled rectifier tubes is increased to a value where the tubes conduct. A relatively large capacitor 84 is provided to time the rise of voltage on the aforementioned control electrodes so that the voltage rises gradually rather than rising instantaneously. This is desirable to prevent excessive output current to the motor armature during the transient period in the event arm 52a of the speed-setting rheostat is quickly moved from the negative end of the latter all the way to the positive end, which might occur in the absence of capacitor 84.

Fig. 2 graphically shows the operating characteristics of the controlled rectifier tubes. In Fig. 2, curve 124 represents one-half cycle of rectified anode voltage, curve 126 represents the control locus or critical firing voltage of the controlled rectifier tubes while curve 128 represents the alternating bias voltage applied through transformers PT4–6 to the control electrodes, the latter voltage being superimposed upon the adjustable unidirectional control voltage 130 applied to the control electrodes from speed control network 4 through conductors 118 and 120. The control locus of the controlled rectifier tubes as represented by curve 126 is predetermined by the inherent control electrode characteristics of these tubes in a well-known manner. As arm 52a of speed-setting rheostat 52 is moved toward the positive end of the latter, the positive unidirectional control voltage 130 on the control electrodes of the controlled rectifier tubes is correspondingly increased in value. As the alternating voltage applied to the control electrodes is superimposed on the control voltage, the aforementioned increase in control voltage raises the level of the alternating voltage from a cut-off value represented by curve 128 to a given value represented by broken curve 128'. The associated tube is rendered conducting at the point of intersection of curves 128' and 126 and continues to conduct throughout the remaining portion of the half-cycle of anode voltage as indicated by the shaded portion. As seen in Fig. 2, the superimposed alternating voltage is displaced in phase relative to the anode voltage to afford a maximum range of control of conduction of the associated tube. Resistors 72, 74 and 76 in the control electrode circuits function to limit the control electrode currents during the positive half-cycles of the superimposed voltage.

Let it be assumed that the alternating voltage applied through the lower secondary windings of transformers PT1–3 to the input terminals of rectifier bridge 44 affords a voltage of 230 volts across the voltage divider comprising resistors 62 and 64 connected to the output terminals of the latter. Let it also be assumed that resistors 62 and 64 of the voltage divider are proportioned to afford a voltage drop of 20 volts across resistor 62 and a voltage drop of 210 volts across resistor 64. Prior to energization of contractor F and opening of contacts F3, the control electrodes of tubes 12, 14 and 16 will be 20 volts negative relative to their associated cathodes whereby the tubes are prevented from conducting. This is for the reason that the positive end of resistor 62 is connected through conductor 66, resistor 60, terminal 40 and conductor 42 to the cathodes while the negative end of resistor 62 is connected through contacts F3 and R3, common point 70, and the secondary windings of transformers PT4–6 to the control electrodes.

When contactor F is energized as heretofore described and contacts F3 are opened, resistor 62 is effectively disconnected from common point 70 and capacitor 84, and capacitor 84 charges exponentially to a value determined by the setting of arm 52a of the speed-setting rheostat 52 to time the rise of control electrode voltage. Upon adjustment of arm 52a sufficiently to initiate conduction of the controlled rectifier tubes, the resultant current flow through armature A initiates operation of the motor. Further adjustment of arm 52a results in a corresponding adjustment of the speed of the motor. Additional range of motor speed adjustment is afforded by adjustable resistor 46 in the shunt field winding circuit.

The voltage divider comprising resistors 58 and 60 provides automatic control of the armature voltage. As the motor speed increases, a unidirectional voltage is developed across resistors 58 and 60. A predetermined portion of this voltage is applied from the junction of these resistors through conductor 66 and compared with the constant unidirectional reference voltage appearing across resistor 62 in speed control network 4. The difference between the first mentioned unidirectional voltage which is indicative of motor speed and the reference voltage is applied from adjustable arm 52a of speed-setting rheostat 52 through conductor 118, the left-hand portion and arm 114a of rheostat 114, conductor 120, resistor 122, common point 70, the secondary windings of transformers PT4–6 and resistors 72, 74 and 76, respectively, to the control electrodes of controlled rectifier tubes 12, 14 and 16 to control the latter, thus tending to maintain the speed of the motor constant at the preselected value.

The IR drop compensation network shown in the upper right-hand portion of Fig. 1 is provided to maintain the speed of the motor constant under variable load conditions. As the speed of a shunt motor is directly proportional to the difference between the applied armature voltage and the armature IR drop, increase in the motor load causes a decrease in speed. Therefore, in order to maintain the speed of the motor constant as the armature IR drop increases with load, it is necessary to increase the applied armature voltage as a function of the load.

To accomplish this, an alternating voltage is applied from the secondary winding of transformer PT7 through conductors 100 and 102 and transformer PT8 to render rectifier pairs 104, 106 and 108, 110 conductive on alternate half cycles of the alternating voltage. When rectifier pair 104, 106 conducts, a circuit is established from the lower, positive end of resistor 54 in the armature circuit through the center tap and left-hand portion of the secondary winding of transformer PT8, rectifier 104 and the upper portion and center tap of the primary winding of transformer PT9 to the upper, negative end of resistor 54. When rectifier pair 108, 110 conducts, a circuit is established from the positive end of resistor 54 through the center tap and right-hand portion of the secondary winding of transformer PT8, rectifier 110 and the lower portion and center tap of the primary winding of transformer PT9 to the negative end of resistor 54. The resultant voltage induced in the secondary winding of transformer PT9 and which is proportional to the armature current is rectified in bridge 112 and the unidirectional output voltage applied across compensation rheostat 114. A predetermined portion of this voltage is applied from arm 114a of rheostat 114 to the control electrodes of controlled rectifier tubes 12, 14 and 16 to advance the firing point of the latter and thereby to increase the armature voltage in response to increase in motor load.

The function of current limit relay SR is to limit the armature current to a safe value. Should the armature current increase above a predetermined safe value, relay SR responds and closes contacts SR1. Closure of contacts SR1 connects the voltage appearing across resistor 62 to the control electrode-cathode circuits of the controlled rectifier tubes thereby to initiate discharge of capacitor 84 and driving of the control electrodes toward negative. As a result the firing point of the controlled rectifier tubes is retarded and consequently the armature current decreased. This action is so rapid that relay SR energizes only momentarily to bring the armature current back to a safe value.

To stop the motor, the stop switch is momentarily pressed to open contacts 94. Opening of contacts 94 interrupts the holding circuit of forward contactor F, resulting in opening of contacts F1, F2 and F4 and closure of contacts F3 and F5. Contacts F1 and F2 interrupt the armature circuit while contacts F4 further interrupt the aforementioned holding circuit whereafter the stop switch may be released. Contacts F3 reconnect resistor 62 across the control electrode-cathode circuits of the controlled rectifier tubes to drive the latter to cut-off. Contacts F5 complete the energizing circuit of contactor DB whereupon the latter responds to establish dynamic braking connections at contacts DB1 to brake the motor.

Reverse operation of the motor is attained by pressing the reverse switch to close contacts 96 and open interlocking contacts 92. Closure of contacts 96 results in energization of reverse contactor R while opening of contacts 92 prevents operation of the forward contactor. Contactor R thus being energized closes contacts R1 and R2 to establish reverse energization of armature A while contacts R3 and R5 perform the same functions discussed in connection with contacts F3 and F5 and contacts R4 afford results complementary to those described in connection with contacts F4.

The function of anti-plugging relay VR is to prevent restarting or reverse energization of the motor after the stop switch has been pressed until the armature voltage has decreased to a low value. If either the forward switch or reverse switch were pressed immediately after operation of the stop switch, to call for operation in the opposite direction, the output voltage of the rectifier system and the counter voltage of the motor would be additive with only the armature resistance to limit the current; hence, the armature current would rise to excessively high values sufficient to damage both motor and controller. To prevent such increase in armature voltage to a dangerous value, relay VR is connected in parallel with the armature. Under the aforementioned conditions, relay VR responds to open contacts VR2 in circuit with the operating coils of the forward and reverse contactors to prevent reoperation of the motor. Contacts VR1 open to insert resistor 56 in series with the operating coil of relay VR to protect the latter and to afford more rapid release of relay VR. When the armature voltage decreases to approximately one-tenth of its operating value in response to dynamic braking of the motor, relay VR releases to reclose a point in the energizing circuits of the forward and reverse contactors at contacts VR2. Contacts VR1 also reclose to shunt resistor 56.

An essential feature of the invention resides in the provision of resistors 24, 26 and 28 in the anode circuits of the controlled rectifier tubes and resistors 30, 32 and 34 in the anode circuits of the uncontrolled rectifier tubes. Prior to employment of these resistors, tube failures occurred so frequently as to substantially increase maintenance costs particularly in the higher voltage control systems. These resistors having predetermined values for different motor ratings decrease tube failures to a minimum. This is for the reason that short circuit currents through the tubes are limited to prevent two tubes from firing simultaneously. The tendency of the tubes to backfire is reduced and the backfiring current, if any, is decreased to a low value incapable of tube destruction. In addition, the aforementioned resistors function to maintain current balance among the rectifier tubes and serve to dissipate the stored inductive energy in the motor armature. Furthermore, in the event of an "odd" tube having characteristics differing from those of the other tubes, the invention makes it less likely that a fault will occur.

The aforementioned abnormal conditions heretofore had a greater tendency to occur during a given low speed, at full load and under conditions of inductance in the armature. If one tube failed, the motor speed might increase to a given higher value and remain at such speed. With the present invention, these abnormal conditions have been substantially eliminated.

In the modification shown in Fig. 3, elements corresponding to similar elements in Fig. 1 have been given like reference characters.

The modification shown in Fig. 3 differs from the control system hereinbefore described in that a control electrode bias adjustment circuit as well as an electronic circuit affording a steep wave front for firing the controlled rectifier tubes have been added. Although reversing control and IR drop compensation apparatus have been omitted for the sake of simplicity, it will be understood that these features could as well be employed in this modification in the manner disclosed in connection with Fig. 1.

Referring to the modification shown in Fig. 3, there is shown a unidirectional control system for a direct current motor having an armature A and a shunt field winding SHF. A speed control network 4 is provided for manually controlling the armature voltage to adjust the speed of the motor. A rectifier network 2 similar to that hereinbefore described and comprising uncontrolled rectifier tubes 6, 8 and 10 and controlled rectifier tubes 12, 14 and 16 is provided for supplying full-wave rectified alternating current power to the armature winding of the motor. A full-wave rectifier bridge 44 is provided for supplying rectified alternating current power from lines L1, L2 and L3 to the shunt field winding of the motor and through conductors 48 and 50 to speed control network 4.

Armature A of the motor is connected across output terminals 40 and 38 of rectifier tube network 2 in a circuit extending through normally open contacts M1 of a main contactor M and resistor 54. Dynamic braking resistor DBR is connected across armature A through normally open contacts DB1 of a dynamic braking contactor DB. The operating coil of a current limit relay SR is connected across resistor 54 in the motor armature circuit.

Control tubes 300, 302 and 304 are provided for controlling the controlled rectifier tubes 12, 14 and 16, respectively, as hereinafter described. Alternating anode voltage is supplied from lines L1—3, L2—1 and L3—2 to the anodes of tubes 300, 302 and 304 through transformers PT7, PT8 and PT9, respectively, first secondary windings of these transformers being connected in series with the primary windings of coupling transformers PT10, PT11 and PT12 across the anodes and cathodes of the respective control tubes. The other secondary windings of transformers PT7, PT8 and PT9 are connected across the respective cathodes of tubes 300, 302 and 304 to supply heating current to the latter.

Speed control network 4 comprises the aforementioned speed-setting rheostat 52 having its opposite ends connected across the positive and negative output terminals of rectifier bridge 44. A voltage divider comprising series connected resistors 62 and 64 is connected across rheostat 52. The junction of resistors 62 and 64 is connected through conductor 66 to the junction of resistors 58 and 60 of another voltage divider, the latter being series connected across output terminals 38 and 40 of rectifier tube network 2. The negative end of rheostat 52 is connected through normally closed contacts M2 and normally open contacts SR1 in parallel to common point 70. Adjustable arm 52a of rheostat 52 is connected through resistor 122 and common point 70 to conductor 71 where the circuit divides. One branch extends through the secondary winding of transformer PT4 and parallel-connected resistor 306 and capacitor 308 to the control electrode of tube 300. Another branch extends through the secondary winding of transformer PT5 and parallel-connected resistor 310 and capacitor 312 to the control electrode of tube 302. And a third branch extends through the secondary winding of transformer PT6 and parallel-connected resistor 314 and capacitor 316 to the control electrode of tube 304. The cathodes of tubes 300, 302 and 304 are connected together and through conductor 317 to output terminal 40, the latter being connected to common point 70 through capacitor 84.

A transformer PT14 having a primary winding connected across lines L1 and L3 and upper and lower secondary windings is provided for supplying bias adjustment network 318 and contactor circuit 320, respectively. Network 318 comprises a full-wave rectifier bridge 322 having it input terminals connected across the upper secondary winding of transformer PT14. The positive and negative output terminals of rectifier bridge 322 are connected across rheostat 324, while the junction of rheostat 324 and the positive output terminal of bridge 322 is connected through terminal 40 and conductor 42 to the cathodes of the controlled rectifier tubes. A filter capacitor 326 is connected across rheostat 324 to smooth the rectified voltage wave. Adjustable arm 324a of rheostat 324 is connected through the secondary windings of transformers PT10, PT11 and PT12 and resistors 72, 74 and 76, respectively, to the control electrodes of the controlled rectifier tubes in network 2 to initially bias the latter to cut-off.

Contactor circuit 320 is supplied across the lower secondary winding of transformer PT14 through conductors 328 and 330. Circuit 320 comprises a timing device TR such as a motor driven timer or the like having its operating coil connected through normally closed contacts CR2 of a control relay CR across conductors 328 and 330. The operating coil of relay CR is connected across conductors 328 and 330 through normally open contacts TR1 of timing device TR. Relay CR is provided with normally open contacts CR1 for completing a holding circuit for its operating coil in shunt of contacts TR1. The operating coil of the aforementioned dynamic braking contactor DB is connected across conductors 328 and 330 through normally closed contacts M4 of main contactor M. Circuit 320 is further provided with series connected normally open start switch 332 and normally closed stop switch 94 for completing a circuit therethrough and through contacts CR1 and the operating coil of contactor M across conductors 328 and 330. Contactor M is provided with normally open contact M3 for completing a holding circuit for its operating coil in shunt of start switch 332.

The operation of the modified control system will now be described. Let it be assumed that power is supplied to lines L1, L2 and L3 from a three-phase power supply source (not shown). Thus, power is supplied through the primary windings and the upper and middle secondary windings of transformers PT1, PT2 and PT3 to heat the cathodes of the uncontrolled and controlled rectifier tubes in network 2. Power is also supplied through the lower secondary windings of the aforesaid transformers to input terminals 44a, 44b and 44c of rectifier bridge 44, and then from the positive and negative output terminals 44d and 44e of the latter on the one hand through adjustable resistor 46 to shunt field winding SHF and on the other hand through conductors 48 and 50 across speed-setting rheostat 52. In addition, power is supplied from lines L1, L2 and L3 through resistors 24, 26 and 28 to respectively associated anodes 12a, 14a and 16a of controlled rectifier tubes 12, 14 and 16, and then through cathodes 12c, 14c and 16c and common conductor 42 to output terminal 40. Alternating current voltage is further supplied from lines L1, L2 and L3 through transformers PT6, PT4 and PT5 to the control electrode circuits of control tubes 304, 300 and 302, respectively, and through transformers PT7, PT8 and PT9 to the anode-cathode circuits of the control tubes. The primary windings of transformers PT4, PT5 and PT6 are connected between lines L1—3 and common point 68 so that the voltage applied to the control electrodes of tubes 300, 302 and 304 is displaced in phase relative to the anode voltage thereof as hereinafter more fully described. Alternating current power is also supplied from lines L1 and L3 through transformer PT14 to bias adjustment network 318 and contactor circuit 320 to energize the same.

Circuit 320 thus being energized results in energization of the operating coil of dynamic braking contactor DB through contacts M4 to close contacts DB1 thereby to connect dynamic braking resistor DBR across the motor armature, and energization of the operating coil of timing device TR through contacts CR2. After a predetermined time interval sufficient to allow the cathodes of the electron discharge devices to heat, timing device TR responds to close contacts TR1. Closure of contacts TR1 completes an energizing circuit for the operating coil of control relay CR across conductors 328 and 330. Relay CR thus being energized closes contacts CR1 to complete a holding circuit for its operating coil and opens contacts CR2 to interrupt energization of timing device TR.

The system is now in a preparatory condition wherein shunt field winding SHF is energized and dynamic braking is established to prevent motor rotation. Rheostat 324 may be adjusted to provide the desired negative bias on the control electrodes of the controlled rectifier tubes. The voltage applied through the upper secondary winding of transformer PT14 to the input terminals of rectifier bridge 322 is rectified in the latter and applied from the positive and negative output terminals thereof across rheostat 324. An adjustable portion of this voltage is applied from arm 324a of rheostat 324 to the control electrodes of rectifier tubes 12, 14 and 16. This negative bias voltage is sufficient to bias the controlled rectifier tubes to cut-off.

The motor speed may be preselected by adjustment of arm 52a of speed-setting rheostat 52. An adjustable portion of the rectified voltage applied from the positive and negative output terminals of rectifier 44 across rheostat 52 is applied from arm 52a of the latter through resistor 122, common point 70, the secondary windings of transformers PT4, PT5 and PT6 and resistors 306, 310 and 316 to the control electrodes of control tubes 300, 302 and 304. However, prior to pressing the start switch and opening of contacts M2, control tubes 300, 302 and 304 are biased to cut-off from speed control network 4 in a manner similar to that described in connection with Fig. 1. Thus, the voltage applied from rectifier bridge 44 across speed-setting rheostat 52 is also applied in parallel with the latter across the voltage divider comprising resistors 62 and 64. A predetermined positive portion of this voltage is applied from the junction of resistors 62 and 64 through conductor 66, resistor 60, output terminal 40 and conductor 317 to the cathodes of control tubes 300, 302 and 304, while the negative voltage appearing at the left-hand end of resistor 62 is applied through contacts M2, common point 70 and conductor 71 and then through the secondary windings of transformers PT4, PT5 and PT6 and resistors 306, 310 and 314 to the respective control electrodes of the control tubes to bias the latter to cut-off.

To start the motor, start switch 332 is momentarily pressed to complete an energizing circuit for the operating coil of main contactor M from conductor 328 through contacts CR1 and stop switch 94 to conductor 330. Contactor M thus being energized closes contacts M1 to complete an energizing circuit for armature A across the output terminals of rectifier tube network 2 in a circuit extending from terminal 40 through armature A, contacts M1 and resistor 54 to terminal 38. Contacts M4 open to interrupt the energizing circuit of the operating coil of contactor DB, contacts M3 close to complete the aforementioned holding circuit to maintain contactor M after release of the start switch, and contacts M2 open to disconnect the aforementioned negative bias from the control electrodes of control tubes 300, 302 and 304. Contactor DB thus being deenergized opens contacts DB1 to interrupt dynamic braking of the motor. Removal of the negative bias from the control tubes renders the positive voltage applied from arm 52a of speed-setting rheostat 52 to the control electrodes of tubes 300, 302 and 304 effective to fire the latter.

When contactor M is energized as hereinbefore described and contacts M2 are opened, capacitor 84 is effectively inserted in parallel with the control electrode-cathode circuits of the control tubes, and capacitor 84 charges exponentially to a value according to the setting of rheostat 52. Thus, the control electrode voltage rises gradually rather than rising instantaneously. This is necessary to prevent excessive output current to the motor armature during the transient period in the event arm 52a of the speed-setting rheostat is quickly moved from the negative end of the latter all the way to the positive end.

The amount of conduction of control tubes 300, 302 and 304 is preselected and controlled by adjustment of arm 52a of rheostat 52. As arm 52a is moved from the left-hand negative end of its associated resistor toward the right-hand positive end, the unidirectional control voltage applied to the control electrodes is increased to a value where the tubes conduct. The unidirectional control voltage has superimposed thereon an alternating voltage derived through transformers PT4, PT5 and PT6. Thus, each of the control tubes 300, 302 and 304 is rendered conductive at a point in its anode voltage wave wherein the superimposed control voltage wave intersects the control locus of the tube. The tube then continues to conduct throughout the remainder of the half-cycle corresponding to the shaded portion as described in connection with Fig. 2.

Fig. 4 graphically depicts the operating characteristics of controlled rectifier tubes 12, 14 and 16 of Fig. 3. Curve 340 represents one-half cycle of rectified anode voltage, curve 342 represents the control locus or critical firing voltage of the controlled rectifier tubes, and curve 344 represents the output voltage of control tubes 300, 302 and 304 applied from the anodes of the latter through coupling transformers PT10, PT11 and PT12 and resistors 72, 74 and 76, respectively, to the control electrodes of the controlled rectifier tubes. Curve 344 corresponds to the shaded portion in Fig. 2 derived in the manner hereinbefore described.

It will be apparent from curve 344 that control tubes 300, 302 and 304 provide a voltage having a steep wave front to positively insure firing of the controlled rectifier tubes at the point of intersection of curve 344 with curve 342. The controlled rectifier tubes then continue to conduct throughout the remaining portion of the half-cycle of anode voltage as indicated by the shaded portion in Fig. 4. The bias adjustment afforded by rheostat 324 is utilized to adjust the level of the base line of curve 344.

The speed of the motor may be adjusted from speed-setting rheostat 52. As arm 52a of the latter is moved toward the positive end, the positive unidirectional voltage on the control electrodes of tubes 300, 302 and 304 is correspondingly increased in value. As a phase-displaced alternating voltage is superimposed on the unidirectional voltage, the aforementioned increase in unidirectional voltage advances the firing point of tubes 300, 302 and 304 as depicted by curve 344' in Fig. 4 to render the latter conducting over a correspondingly larger portion of the half-cycle of anode voltage. The result is to advance the firing point of the controlled rectifier tubes thereby to increase the armature voltage of and consequently the speed of the motor.

The voltage dividers comprising resistors 58, 60 and 62, 64 provide automatic control of the armature voltage, relay SR functions to limit the armature current, and the resistors in the anode circuits of the uncontrolled and controlled rectifier tubes have the functions described in connection with Fig. 1.

Thus, it should be apparent that the invention provides an improved system of extreme simplicity and good performance for supplying and controlling power from a plural-phase alternating current supply source to a shunt wound direct current motor. The invention is especially applicable to "package-drive" type systems and affords greater accuracy in speed regulation than the more complicated systems heretofore known.

I claim:

1. In an electrical system for controllably transferring energy from a plural-phase alternating current power supply source to an inductive direct current load, a control system comprising two groups of unidirectional current conducting devices, one of said groups of devices being controllable and the other of said groups of devices being uncontrollable, means for connecting one of said groups of devices for conduction between the plurality of phases of said source and said load and for connecting the other group of devices for conduction between said load and said plurality of phases of said source to form a plurality of conduction paths from said source to said load with a controllable and an uncontrollable device in each path for full-wave transfer of energy from said source to said load, means for controlling conduction of said controllable devices in a predetermined repetitively sequential order to control energization of said load, and protective means for preventing the inductive effect of the load from causing abnormal conduction of said devices, said protective means comprising a resistor in each of said paths.

2. The invention defined in claim 1, wherein said protective means comprises a resistor in series with each of said uncontrollable devices and a resistor in series between each phase of said source and each of said controllable devices.

3. The invention defined in claim 1, wherein said protective means comprises a resistor in series with each of said undirectional current conducting devices.

4. The invention defined in claim 1, together with voltage divider means connected to said load and responsive to the voltage applied to said load for deriving a signal as a function thereof, means for providing a reference signal, and selectively adjustable means for comparing the first mentioned signal and said reference signal to derive a resultant signal for controlling conduction of said controllable devices.

5. The invention defined in claim 4, together with means for controlling conduction of said controllable devices as a function of the energization of the load comprising means responsive to variations in the value of current in said load for controlling conduction of said controllable devices to adjust the voltage applied to said load.

6. The invention defined in claim 4, together with current limit means for limiting the maximum load current to a predetermined safe value, said current limit means comprising electroresponsive means operable in response to increase in the value of said current above said predetermined value for decreasing conduction of said controllable devices thereby to decrease the energization of the load.

7. The invention defined in claim 1, wherein said means for controlling conduction of said controllable devices includes control apparatus comprising a full-wave plural-phase rectifier bridge for supplying said controllable devices with rectified alternating current control voltages, means for supplying said controllable devices with phase-displaced alternating bias voltages superimposed on the respective control voltages, the bias voltage supplied to each controllable device being displaced in phase relative to the power supply voltage connected to the corresponding device, selectively adjustable means in circuit with said rectifier bridge for adjusting the values of said control voltages to render said controllable devices conducting and to selectively change the amount of conduction therethrough, and a capacitor in circuit with said selectively adjustable means for preventing excessive conduction of said controllable devices during the transient period following rapid adjustment of said adjustable means.

8. The invention defined in claim 1, wherein said means for controlling conduction of said controllable devices includes a control network comprising electric discharge devices for providing for each controllable device a control voltage wave having a steep wave front and displaced in phase relative to the phase of the power supply voltage connected to the corresponding controllable device, selectively adjustable means for advancing or retarding the phase of said control voltage wave, and means for coupling said control voltage waves from said electric discharge devices to said controllable devices for controlling conducting of the latter.

9. In a control system for supplying a direct current motor from a three-phase alternating current supply source, in combination, a three-phase rectifier network comprising a plurality of controllable electric discharge devices, each of said devices having main electrodes and a control electrode, means for connecting the supply source through said main electrodes of said devices to an inductive operating winding of the motor to provide full-wave rectified alternating current power thereto, a motor speed control network for controlling conducting of said discharge devices thereby to adjust the speed of the motor to a desired value, said network comprising means for initially biasing said control electrodes of said devices to cut-off, means for initiating operation of the motor, means responsive to said initiating means for applying to said control electrodes of said discharge devices control signals for rendering the latter cyclically conducting, means for selectively adjusting said control signals to adjust the speed of the motor, and a resistor in series with the main electrodes of each of said discharge devices for preventing the inductive action of the motor operating winding from affecting the cyclical conduction of said discharge devices.

10. The invention defined in claim 9, wherein said operating winding is the armature winding of the motor together with means for automatically adjusting the armature voltage as a function of a variation in motor load to maintain the motor speed constant, said automatic adjusting means comprising a static network for deriving an alternating voltage as a function of the motor load current, means for rectifying said alternating voltage, and adjustable means for applying a selected portion of the resultant unidirectional voltage to said control electrodes of said controllable discharge devices to control conduction of the latter thereby to regulate the armature voltage.

11. The invention defined in claim 9, wherein said operating winding is the armature winding of the motor, together with an armature IR drop compensation network comprising a dual-path gating circuit having an output circuit connected between said paths, means connecting said gating circuit to said supply source for rendering said paths conducting on alternate half-cycles of the alternating voltage, means for applying to said output circuit during said conducting periods of said paths a signal proportional to the armature current, means for rectifying said signal, and means for applying said rectified signal to said control electrodes of said discharge devices to regulate the armature voltage in accordance with a change in motor load thereby to maintain the motor speed constant.

12. In a control system for supplying the armature winding of a direct current motor from a plural-phase alternating current power supply source, in combination, a rectifier network comprising a controllable and an uncontrollable electric discharge device in circuit with each of the phases of the supply source for supplying full-wave rectified power to the armature winding of the motor, a resistor in series with the main discharge path of each said electric discharge device for effectively suppressing the inductive action of the armature winding on the sequential function of said discharge devices, means for adjustably controlling conduction of said controllable discharge devices to adjust the armature voltage, said means comprising an electronic controlling device associated with each of said controllable devices for applying to the control electrodes of the latter in a repetitively sequential order control pulses having a steep wave front, each of said pulses being displaced in phase relative to the anode voltage wave of the associated controllable device, and selectively adjustable means for operating said controlling devices to advance or retard said pulses relative to the phases of the anode voltage waves of the respectively associated controllable devices.

References Cited in the file of this patent

UNITED STATES PATENTS

| | | |
|---|---|---|
| 2,288,339 | Willis | June 30, 1942 |
| 2,572,824 | Wilkins | Oct. 23, 1951 |
| 2,720,621 | Shrider et al. | Oct. 11, 1955 |
| 2,753,506 | Elliot | July 3, 1956 |
| 2,778,983 | Elliot | Jan. 22, 1957 |
| 2,785,368 | Elliot | Mar. 12, 1957 |